(12) United States Patent
Cope et al.

(10) Patent No.: US 7,984,475 B1
(45) Date of Patent: Jul. 19, 2011

(54) VIDEO CHANNEL BROADCAST USING ETHERNET TECHNOLOGY

(75) Inventors: Warren B. Cope, Olathe, KS (US);
Chuck Diaz, Olathe, KS (US);
Benjamin J. Parker, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1851 days.

(21) Appl. No.: 10/264,772

(22) Filed: Oct. 4, 2002

(51) Int. Cl.
*H04N 7/173* (2011.01)
*G06F 15/177* (2006.01)

(52) U.S. Cl. ......... 725/120; 709/250; 709/220; 709/221

(58) Field of Classification Search ............... 725/80, 725/81, 86, 105, 109, 110, 112, 127; 370/432, 370/390, 463; 709/245, 250
See application file for complete search history.

(56) References Cited

U.S. PATENT DOCUMENTS

| | | | |
|---|---|---|---|
| 5,771,009 A * | 6/1998 | Nakaya | 341/50 |
| 5,936,949 A * | 8/1999 | Pasternak et al. | 370/328 |
| 5,946,313 A * | 8/1999 | Allan et al. | 370/397 |
| 6,111,882 A * | 8/2000 | Yamamoto | 370/399 |
| 7,051,116 B1 * | 5/2006 | Rodriguez-Val et al. | 709/245 |
| 7,228,558 B1 * | 6/2007 | Lebouill | 725/86 |
| 7,269,182 B1 * | 9/2007 | Carrel et al. | 370/432 |
| 2002/0059397 A1 * | 5/2002 | Feola et al. | 709/217 |
| 2004/0022222 A1 * | 2/2004 | Clisham | 370/338 |
| 2004/0153570 A1 * | 8/2004 | Shobatake | 709/238 |
| 2004/0250273 A1 * | 12/2004 | Swix et al. | 725/25 |
| 2005/0068914 A1 * | 3/2005 | Lee et al. | 370/312 |
| 2007/0081533 A1 * | 4/2007 | Mizukoshi | 370/389 |

FOREIGN PATENT DOCUMENTS

| EP | 1 517 559 A2 * | 3/1999 |
|---|---|---|
| EP | 1517559 A2 * | 3/2005 |

OTHER PUBLICATIONS

"Inetcable.com, USA Video Interactive Partner for Internet TV," 2002 ASP Industry Insight, Jun. 26, 2000 http://www.internetnews.com/bus-news/print/0,,3__402531,00.html.

* cited by examiner

*Primary Examiner* — Andrew Y Koenig
*Assistant Examiner* — Jasmine Stokely-Collins (57) ABSTRACT

A communication system is disclosed comprised of a primary Ethernet broadcast system, a node, and a secondary Ethernet broadcast system. The primary Ethernet broadcast system broadcasts multiple video channels each corresponding to an Ethernet address. The node receives a request for a video channel. The node determines the Ethernet address of the selected video channel and transmits a response to the request that includes the Ethernet address of the selected video channel.

40 Claims, 7 Drawing Sheets

VIDEO CHANNEL BROADCAST USING ETHERNET TECHNOLOGY

BACKGROUND OF THE INVENTION

1. Field of the Invention

The invention is related to the field of communications systems, and in particular, to broadcasting video channels using Ethernet technology.

2. Statement of the Problem

People traditionally receive television channels over a regular TV antenna, a coaxial cable, or a satellite dish. The advent of the Internet now allows people to receive Internet Protocol (IP) based video over their computers. To receive video over a computer, a user selects a video clip. For instance, the video clip may be a news clip from the CNN web site. The user's computer sends a request for the video clip to a server for the CNN web site. The user's computer has a unique IP address that it includes in the request. The server on the CNN web site receives the request and transmits the video clip to the IP address of the user's computer. The user is able to view the video clip over the computer.

If the user's computer is connected to an Ethernet LAN, the user's computer also has an Ethernet card that is assigned a unique Ethernet address for that LAN. An Ethernet switch for the LAN receives the video clip from the CNN server and formats the video clip in Ethernet frames. Each of the Ethernet frames includes the Ethernet address of the user's computer. The user's computer listens to the Ethernet LAN for the frames having it's Ethernet address and collects those frames. The user's computer then displays the video clip.

Unfortunately, video clips are currently transmitted as unicast streams to the requesting computer. Unicast streams can waste valuable bandwidth and resources. Multiple copies of the same video clip may be transmitted over the same communication link, which can overload the communication link. Considering the size of video clips, this could be a tremendous waste of bandwidth, especially for communications links like DSL. These problems are further illustrated in FIG. 1.

Also, Ethernet cards are currently configured to listen to a single Ethernet address on an Ethernet LAN. The Ethernet address assigned to the Ethernet card of a computer is fixed and the Ethernet card does not listen for other addresses. This unfortunately limits the data a computer can pull off of an Ethernet LAN.

SUMMARY OF THE SOLUTION

The invention helps solve the above problems by broadcasting video channels using Ethernet addresses. The invention takes advantage of Layer 2 technology in place of Layer 3 technology to broadcast the video channels. A communication device of the invention can be programmed with different Ethernet addresses, instead of a previous communication device that has a fixed Ethernet address, to receive a video channel. Then, multiple communication devices can receive the same video channel when only one copy of the video channel is being broadcasted. The broadcasting of one copy of the video channels, instead of unicasting, helps to conserve bandwidth and resources.

One embodiment of the invention includes a communication system comprised of a primary Ethernet broadcast system, a node, and a secondary Ethernet broadcast system. The primary Ethernet broadcast system broadcasts multiple video channels. Each of the video channels corresponds to an Ethernet address. The node receives a request for a video channel and determines the Ethernet address of the selected video channel. The node transmits a response to the request that includes the Ethernet address of the selected video channel. The node also transmits the selected video channel to the secondary Ethernet broadcast system for broadcasting by the secondary Ethernet broadcast system.

In another embodiment, the communication system also includes a display system. The display system transmits the request for the video channel to the node. The display system receives the response from the node that includes the Ethernet address of the selected video channel. The display system listens to the secondary Ethernet broadcast system for the Ethernet address of the selected video channel to collect the selected video channel. The display system then displays the selected video channel to a viewer.

Another embodiment of the invention includes a communication device comprised a programmable Ethernet interface system and a processing system. The programmable Ethernet interface system listens to an Ethernet link for an initial Ethernet address to collect data for the communication device. If a video channel is selected by a viewer, the processing system transmits a request for the selected video channel. Responsive to the request, the processing system receives a response that indicates an Ethernet address corresponding to the selected video channel. The processing system assigns the Ethernet address of the selected video channel to the programmable Ethernet interface system. The programmable Ethernet interface system then listens to the Ethernet link for the Ethernet address of the selected video channel to collect the selected video channel.

Another embodiment of the invention includes a communication system comprised of an Ethernet broadcast system, a node, and a control system. The control system receives a request for a video channel from the node and determines the Ethernet address that corresponds to the requested video channel. The control system transmits a response to the request that includes the Ethernet address of the requested video channel. The control system also transmits the requested video channel to the Ethernet broadcast system for broadcasting by the Ethernet broadcast system.

The invention(s) may comprise other embodiments provided below.

DESCRIPTION OF THE DRAWINGS

The same reference number represents the same element on all drawings.

DETAILED DESCRIPTION OF THE INVENTION

Figure 1:
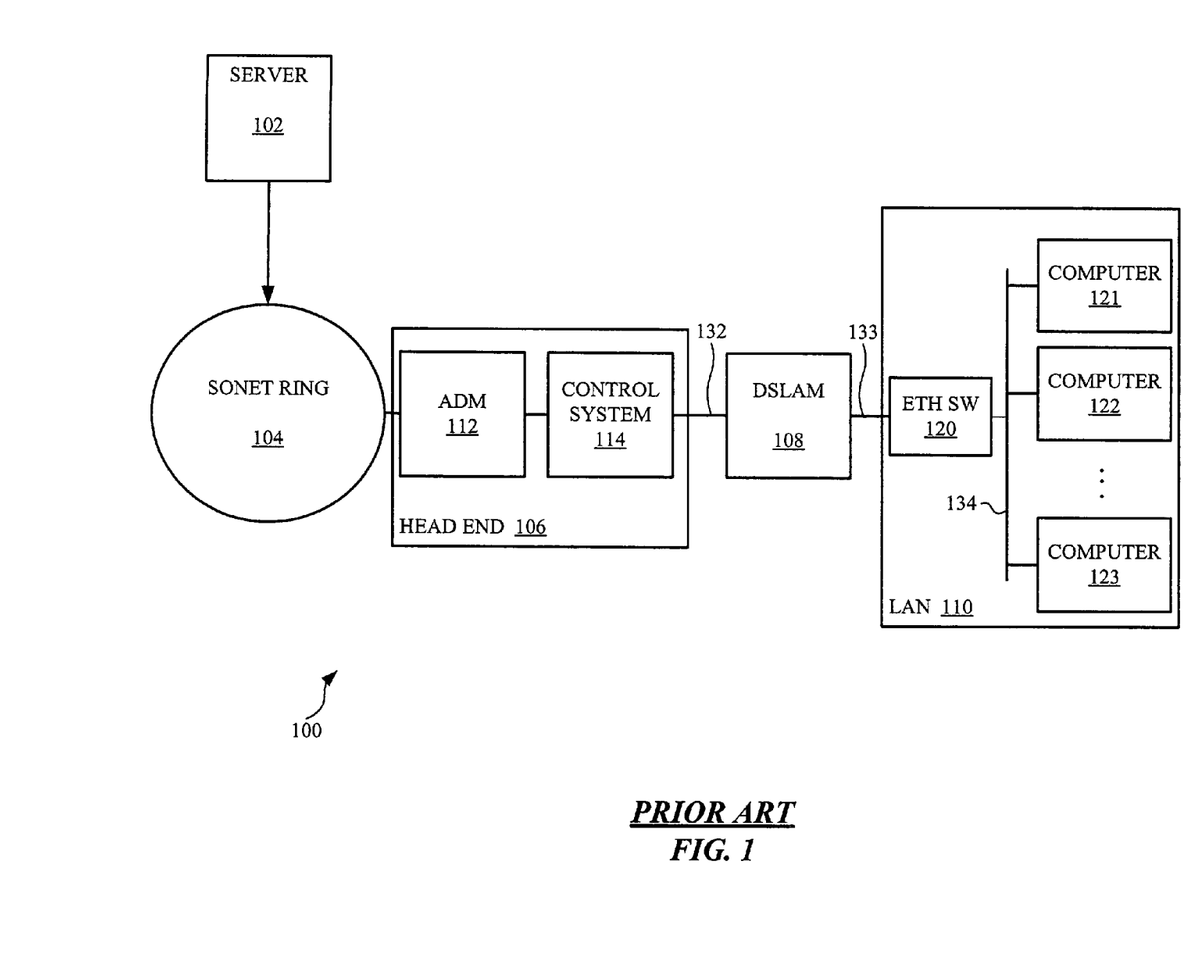
FIG. 1 illustrates a communication system in the prior art.

FIG. 1 illustrates a prior art communication system to help in understanding the invention. FIGS. 2-7 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Communication System—FIG. 1

FIG. 1 illustrates a communication system 100 in the prior art. Communication system 100 is comprised of a server 102, a Synchronous Optical Network (SONET) ring 104, a head end 106, a DSLAM 108, and a Local Area Network (LAN) 110. Head end 106 is comprised of Add/Drop Multiplexer (ADM) 112 and control system 114. LAN 110 is comprised of Ethernet switch 120 and computers 121-123. Computers 121-123 each include an Ethernet card assigned with a unique Ethernet address.

The components of communication system 100 are connected as follows. Server 102 is coupled to SONET ring 104. SONET ring 104 includes an OC-12 link. ADM 112 is coupled to SONET ring 104 and control system 114. Control system 114 is coupled to DSLAM 108 over an OC-3 link 132. DSLAM 108 is coupled to Ethernet switch 120 over a DSL link 133. Ethernet switch 120 is coupled to computers 121-123 over an Ethernet link 134.

As stated above, computers 121-123 each have a unique Ethernet address. Computer 121 has Ethernet address 1. Computer 122 has Ethernet address 2. Computer 123 has Ethernet address 3. As is known in conventional Ethernet, each computer listens to Ethernet link 134 for its Ethernet address. Each computer then collects data having its Ethernet address.

In operation, assume that a user of computer 121 wants to watch video clip A. Computer 121 transmits a request for video clip A to server 102. Server 102 transmits video clip A over SONET ring 104. ADM 112 collects the video clip from SONET ring 104 for use by control system 114. Control system 114 transmits video clip A over OC-3 link 132, DSLAM 108, and DSL link 133 to Ethernet switch 120. Ethernet switch 120 formats video clip A in Ethernet frames having address 1 for computer 121. Ethernet switch 120 then broadcasts video clip A over Ethernet link 134.

Computer 121 listens to Ethernet link 134 for address 1. Computer 121 collects the Ethernet frames having address 1, which comprise video clip A in this instance. Computer 121 then displays video clip A to a user.

At the same time, assume that a user of computer 122 wants to watch video clip A also.

Computer 122 transmits a request for video clip A to server 102. Server 102 receives the request and transmits a second copy of video clip A over SONET ring 104. ADM 112 collects the second copy of video clip A from SONET ring 104 for use by control system 114. Control system 114 transmits the second copy of video clip A over OC-3 link 132, DSLAM 108, and DSL link 133 to Ethernet switch 120. Ethernet switch 120 formats the second copy of video clip A in Ethernet frames having address 2 for computer 122. Ethernet switch 120 then broadcasts the second copy of video clip A over Ethernet link 134.

Computer 122 listens to Ethernet link 134 for address 2. Computer 122 collects the Ethernet frames having address 2, which comprise the second copy of video clip A in this instance. Computer 122 then displays video clip A to a user.

Each time another computer on LAN 110 requests video clip A, server 102 transmits another copy of video clip A over SONET ring 102, OC-3 link 132, DSLAM 108, and DSL link 133 to Ethernet switch 120. Considering the size of video clips, DSL link 133 and/or OC-3 link 132 can become congested when transmitting multiple copies of the same video clip. Unfortunately, communication system 100 wastes bandwidth and resources by unicasting multiple copies of the same video clip.

Figure 2:
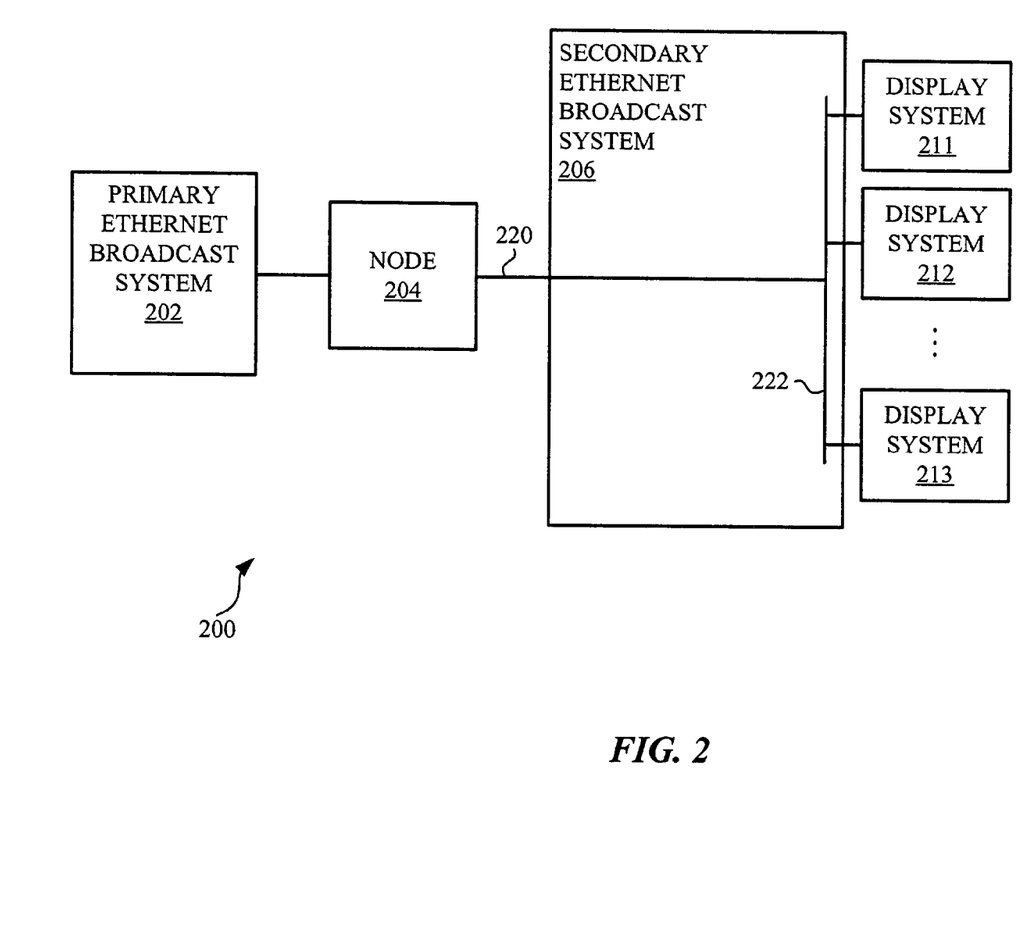
FIG. 2 illustrates a communication system in an example of the invention.

Communication System—FIG. 2

FIG. 2 illustrates a communication system 200 in an example of the invention. Communication system 200 is comprised of a primary Ethernet broadcast system 202, a node 204, a secondary Ethernet broadcast system 206, and display systems 211-213. Primary Ethernet broadcast system 202 is coupled to node 204. Node 204 is coupled to secondary Ethernet broadcast system 206 by link 220. Link 220 may comprise a DSL link. Secondary Ethernet broadcast system 206 is coupled to display systems 211-213. Secondary Ethernet broadcast system 206 includes Ethernet link 222.

The following examples and definitions may be helpful in understanding the invention. A primary Ethernet broadcast system may comprise a Metropolitan Area Network (MAN), a Synchronous Optical Network (SONET) ring, or another network. A secondary Ethernet broadcast system may comprise a Local Area Network (LAN), a wireless LAN, or another system. A display system may comprise a set-top box connected to a television. A video channel comprises any data stream that can be viewed, such as a television channel, a movie, or other data.

In operation, primary Ethernet broadcast system 202 broadcasts multiple video channels. Each of the video channels corresponds to an Ethernet address. Assume for this example that a viewer (not shown) is watching display system 211. The viewer is able to identify the video channels being broadcast over primary Ethernet broadcast system 202. For instance, the viewer may be able to watch a preview channel or look at a programming guide. The viewer selects one of the video channels using display system 211.

Based on the selection by the viewer, display system 211 transmits a request for the selected video channel. Node 204 receives the request for the selected video channel. Node 204 determines the Ethernet address of the selected video channel. Node 204 transmits a response to the request that includes the Ethernet address of the selected video channel. Node 204 also transmits the selected video channel to secondary Ethernet broadcast system 206 which broadcasts the selected video channel. Node 204 could also control transmission of the requested video channel to secondary Ethernet broadcast system 206 from another system.

Display system 211 receives the response from node 204 that includes the Ethernet address of the selected video channel. Display system 211 listens to secondary Ethernet broadcast system 206 for the Ethernet address of the selected video channel to collect the selected video channel. Display system 211 then displays the selected video channel to the viewer. Based on this disclosure, those skilled in the art will appreciate how to modify existing communication systems to make communication system 200.

In one embodiment, assume that another viewer (not shown) is watching display system 212. The viewer of display system 212 selects the same video channel as the viewer of display system 211. Based on the selection by the viewer of display system 212, display system 212 transmits a request for the selected video channel. Node 204 receives the request from display system 212. Node 204 determines the Ethernet address of the selected video channel. Node 204 transmits a response to display system 212 that includes the Ethernet address of the selected video channel. Display system 212 receives the response from node 204 that includes the Ethernet address of the selected video channel. Display system 212 listens to secondary Ethernet broadcast system 206 for the Ethernet address of the selected video channel to collect the selected video channel. Display system 212 displays the selected channel to the viewer.

When two display systems 211-212 request the same video channel, node 204 does not transmit two copies of the same video channel to secondary Ethernet broadcast system 206. Node 204 only transmits one copy of the video channel. Node 204 sends the Ethernet address of the selected video channel to the display systems 211-212. The display systems 211-212 then listen to the same Ethernet address to get the selected video channel. This differs from prior display systems that are each assigned a unique Ethernet address.

In another embodiment, node 204 transmits a tear down message to display system 211. The tear down message instructs display system 211 to stop listening to secondary Ethernet broadcast system 206 for the Ethernet address of the selected video channel. Node 204 may also instruct secondary Ethernet broadcast system 206 to stop broadcasting the selected video channel.

Figure 3:
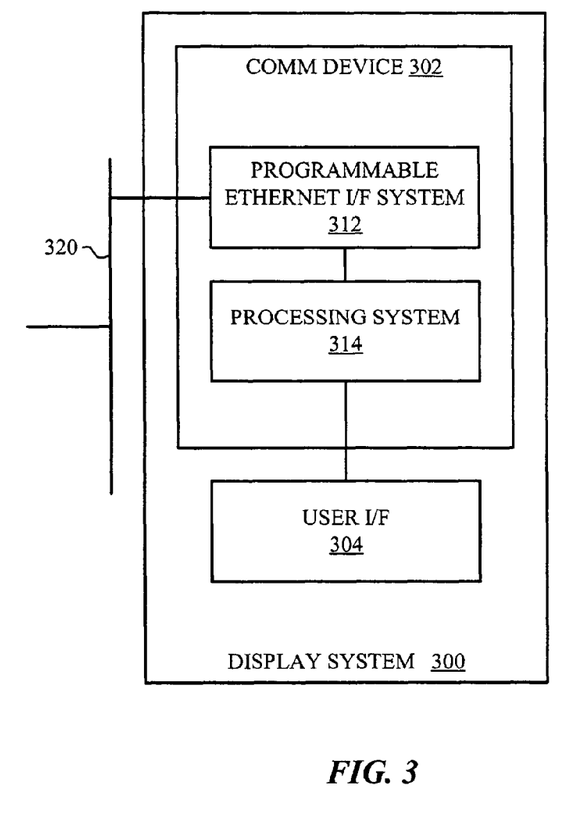
FIG. 3 illustrates a display system in an example of the invention.

Display System—FIG. 3

FIG. 3 illustrates a display system 300 in an example of the invention. Display system 300 may be used for display systems 211-213 in FIG. 2. Display system 300 is comprised a communication device 302 coupled to a user interface 304. Communication device 302 is comprised of programmable Ethernet interface system 312 coupled to a processing system 314. An example of communication device 302 may be a set-top box. An example of user interface 304 may be a television. Programmable Ethernet interface system 312 is also coupled to an Ethernet link 320. Ethernet link 320 may be a wireline link, a wireless link, or another link.

Programmable Ethernet interface system 312 listens to Ethernet link 320 for an initial Ethernet address to collect data for communication device 302. Assume for this example that a viewer (not shown) is watching user interface 304 of display system 300. The viewer is able to identify the video channels being broadcast. For instance, the viewer may be able to watch a preview channel or look at a programming guide. The viewer selects one of the video channels using communication device 302.

When the video channel is selected, processing system 314 transmits a request for the selected video channel. Processing system 314 may transmit the request through programmable Ethernet interface system 312 over Ethernet link 320, or over another link. Responsive to the request, processing system 314 receives a response that indicates an Ethernet address corresponding to the selected video channel. Processing system 314 assigns the Ethernet address of the selected video channel to programmable Ethernet interface system 312. Programmable Ethernet interface system 312 then listens to Ethernet link 320 for the Ethernet address of the selected video channel to collect the selected video channel. Based on this disclosure, those skilled in the art will appreciate how to modify existing display systems to make display system 300.

The above-described communication device 302 may be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 4:
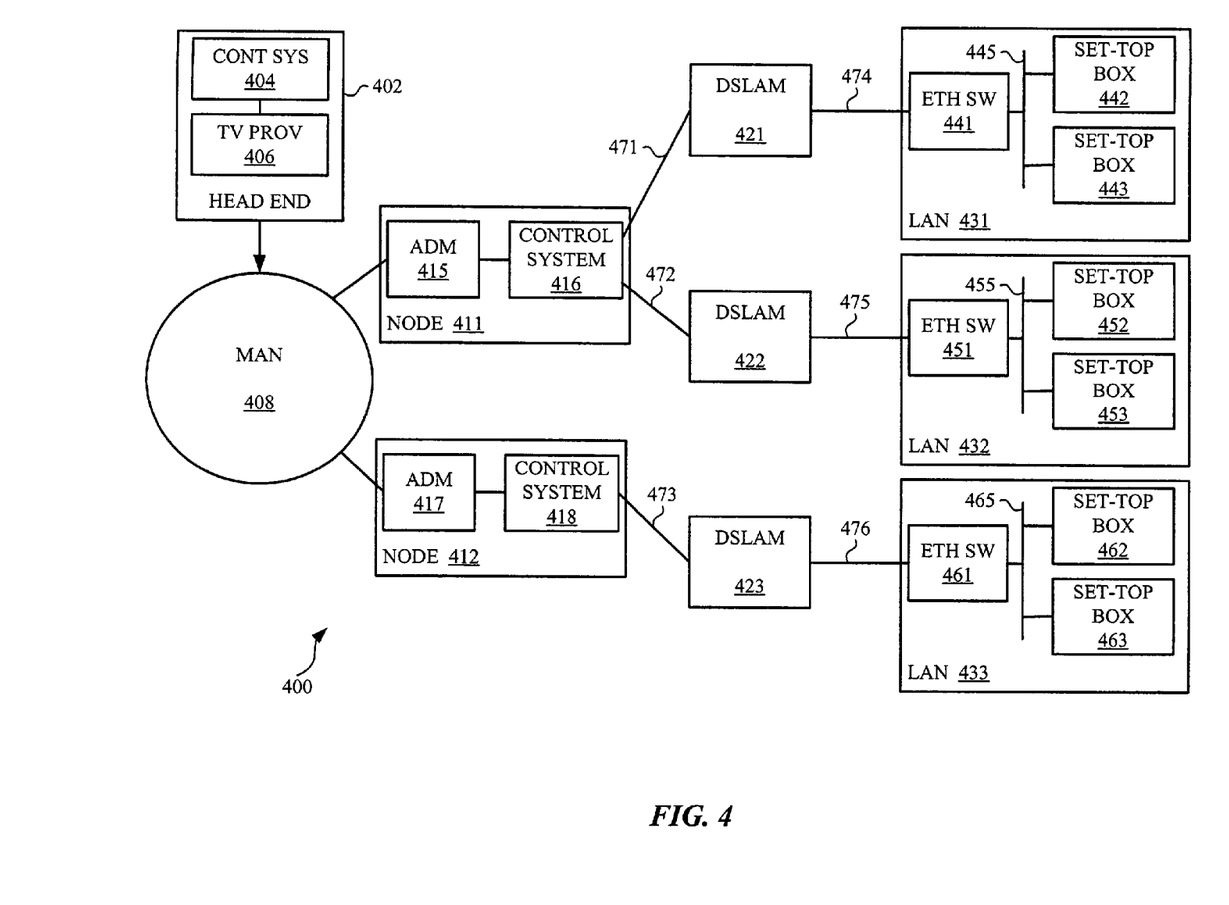
FIG. 4 illustrates a communication system in an example of the invention.
Figure 5:
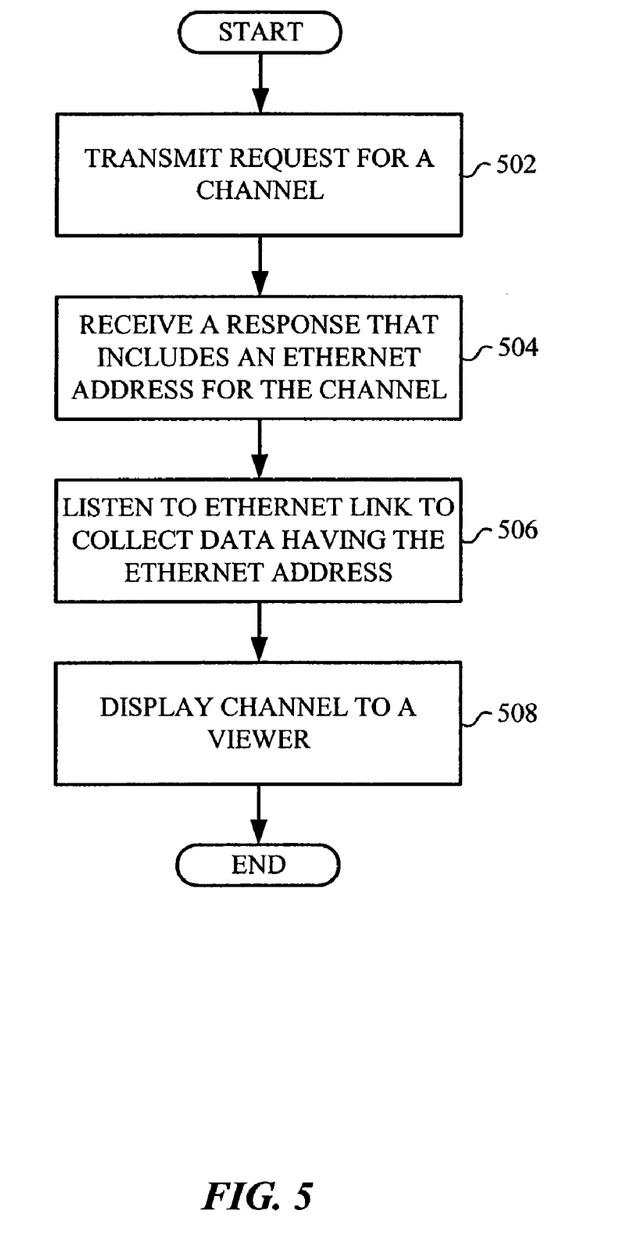
FIG. 5 is a flow diagram illustrating an operation of a communication device in an example of the invention.
Figure 6:
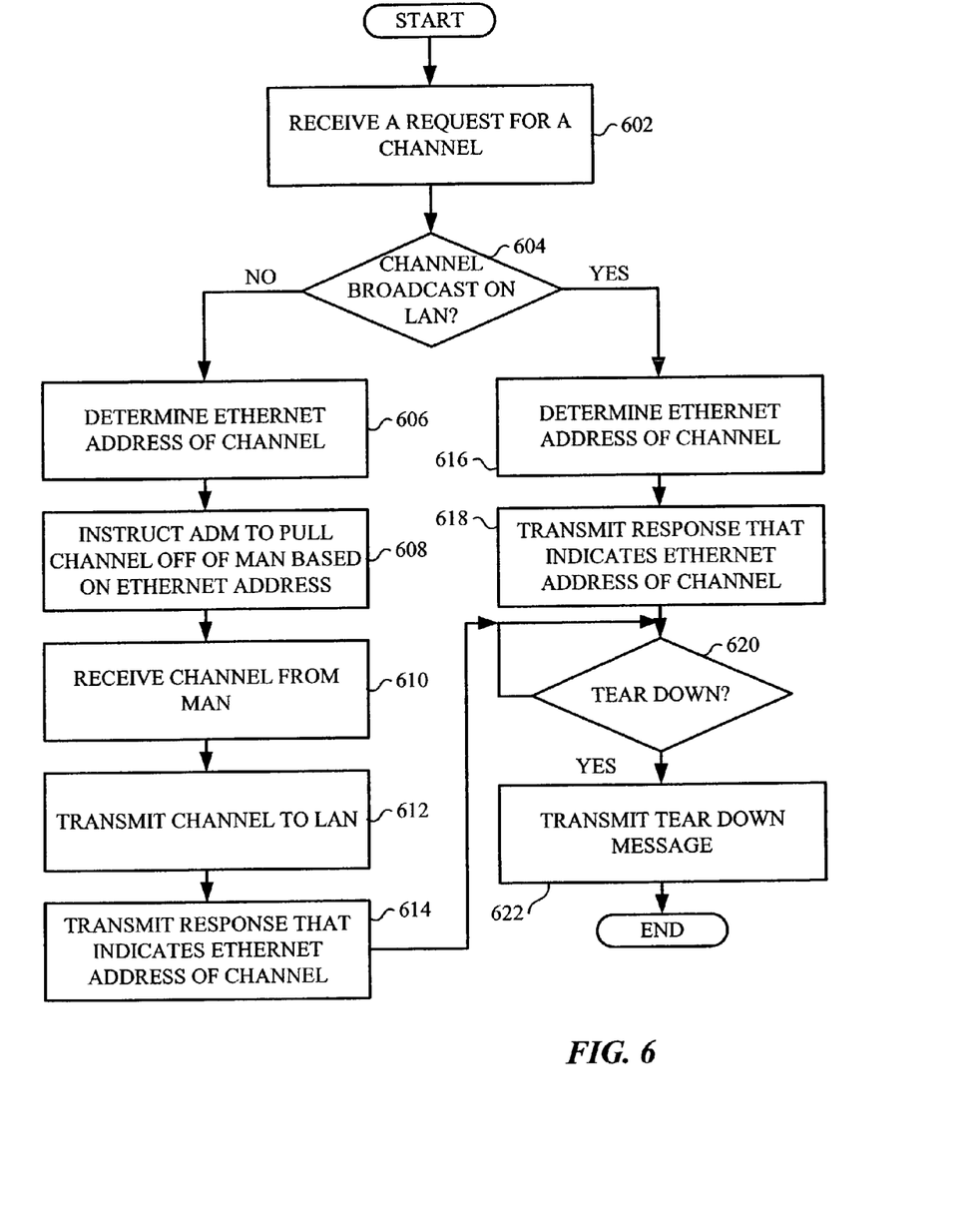
FIG. 6 is a flow diagram illustrating an operation of a control system in an example of the invention.

Communication System Example—FIGS. 4-6

FIG. 4 illustrates a communication system 400 in an example of the invention. Communication system 400 is comprised of head end 402, Metropolitan Area Network (MAN) 408, nodes 411-412, DSLAMs 421-423, and Local Area Networks (LANs) 431-433. Head end 402 is comprised of a control system 404 coupled to a television provider 406. Node 411 is comprised of Add/Drop Multiplexer (ADM) 415 coupled to control system 416. Node 412 is comprised of Add/Drop Multiplexer (ADM) 417 coupled to control system 418. LAN 431 is comprised of Ethernet switch 441 coupled to set-top boxes 442-443 by Ethernet link 445. LAN 432 is comprised of Ethernet switch 451 coupled to set-top boxes 452-453 by Ethernet link 455. LAN 433 is comprised of Ethernet switch 461 coupled to set-top boxes 462-463 by Ethernet link 465.

Television provider 406 is coupled to MAN 408. MAN 408 is coupled to ADMs 415, 417. Control system 416 is coupled to DSLAMs 421-422 over links 471-472, respectively. Control system 418 is coupled to DSLAM 423 over link 473. DSLAM 421 is coupled to Ethernet switch 441 over link 474. DSLAM 422 is coupled to Ethernet switch 451 over link 475. DSLAM 423 is coupled to Ethernet switch 461 over link 476.

In operation, control system 404 instructs television provider 406 to broadcast multiple television channels (assume channels 1-200) over MAN 408. MAN 408 comprises an OC-12 SONET ring. Assume that a different viewer (not shown) is watching a television (not shown) connected to each of set-top boxes 442-443, 452-453, and 462-463. In this example, watching a set-top box means watching a television connected to a set-top box. Each viewer has a guide that identifies each of channels 1-200 to help the viewer select a channel.

Also assume that a viewer of set-top box 442 wants to watch channel 10. The viewer programs set-top box 442 using a remote control or another interface. FIG. 5 is a flow diagram illustrating an operation of set-top box 442 in an example of the invention. When the viewer selects channel 10, set-top box 442 generates a request for channel 10 and transmits the request to control system 416 in step 502. Set-top box 442 may transmit the request over Ethernet link 445 on a contention channel, or over another communication media, such as a phone line.

FIG. 6 is a flow diagram illustrating an operation of control system 416 in an example of the invention. Control system 416 receives the request for channel 10 from set-top box 442 in step 602. In step 604, control system 416 determines if channel 10 is already being broadcast on Ethernet link 445 of LAN 431. If channel 10 is not already being broadcast, then control system 416 determines the Ethernet address of channel 10 in step 606. Each of channels 1-200 corresponds to a different Ethernet address, and control system 416 has a record of such Ethernet addresses. Assume that the Ethernet address of channel 10 is address 10. Control system 416 instructs ADM 415 to listen to the data being broadcast over MAN 408 and collect the data that includes address 10 in step 608. ADM 415 pulls the data including address 10 off of MAN 408 and control system 416 receives channel 10 in step 610. Control system 416 transmits channel 10 to LAN 431 through DSLAM 421 in step 612. Control system 416 may transmit channel 10 using Internet Protocol (IP), Asynchronous Transfer Mode (ATM) protocol, or another protocol. Control system 416 also generates and transmits a response for set-top box 442 that indicates the Ethernet address (address 10) for channel 10 in step 614.

From step 604, if channel 10 is already being broadcast, then control system 416 determines the Ethernet address of channel 10 in step 616. Control system 416 does not transmit another copy of channel 10 to LAN 431 because one copy of channel 10 is already being transmitted on LAN 431. Control system 416 generates and transmits a response for set-top box 442 that indicates the Ethernet address (address 10) for channel 10 in step 618.

In either case above, LAN 431 broadcasts channel 10 over Ethernet link 445. Referring again to FIG. 5, set-top box 442 receives the response from control system 416 that includes the Ethernet address (address 10) of channel 10 in step 504. Set-top box 442 may have an initial address or a previous address to which it was assigned to listen to Ethernet link 445. Based on the response, set-top box 442 listens to Ethernet link 445 for data that includes address 10 and collects or pulls that data off of Ethernet link 445 in step 506. The data with address 10 comprises channel 10. Set-top box 442 then displays channel 10 to the viewer over the television in step 508.

Assume further that a viewer of set-top box 443 wants to watch channel 10 also. When the viewer selects channel 10, set-top box 443 transmits a request for channel 10 to control system 416. Control system 416 operates as described above and illustrated in FIG. 6 to generate and transmit a response for set-top box 443 that indicates the Ethernet address (address 10) for channel 10. Set-top box 443 receives the response from control system 416 that includes the Ethernet address (address 10) of channel 10. Set-top box 443 may have an initial address or a previous address to which it was assigned to listen to Ethernet link 445. Based on the response, set-top box 443 listens to Ethernet link 445 for data that includes address 10 and collects or pulls that data off of Ethernet link 445. The data with address 10 comprises channel 10. Set-top box 443 then displays channel 10 to the viewer over the television.

Advantageously, set-top box 442 and set-top box 443 can both display channel 10, while control system 416 only has to transmit one copy of channel 10. As can be seen, any number of set-top boxes connected to Ethernet link 445 can watch channel 10, while control system 416 only has to transmit one copy of channel 10. This conserves valuable bandwidth, especially on link 474.

Any one of set-top boxes 452-453, 462-463 can also request channel 10. If control system 416 were to receive a request for channel 10 from set-top box 452, control system 416 would have to transmit a new copy of channel 10 to LAN 432. In this example, each LAN would receive one copy of channel 10, if it was requested. Node 418 and LAN 433 would work the same way to provide television channels to set-top boxes 462-463.

Eventually, either the viewer of set-top box 442 changes channels or shuts the system off. If the viewer changes channels, then set-top box 442 receives the Ethernet address of the newly selected channel. If the viewer shuts the set-top box 442 off, then set-top box 442 powers off. Set-top box 442 may revert back to an initial Ethernet address upon subsequent power up.

Control system 416 may tear down a channel being transmitted to a LAN or deny a set-top box access to a channel. Referring to FIG. 6, control system 416 determines if a channel is to be torn down in step 620. To tear down a channel, control system 416 stops transmitting the channel to the LAN and transmits a tear down message to the set-top box in step 622. Control system 416 may also transmit a new Ethernet address to the set-top box. To deny a set-top box access to a channel, control system 416 may transmit an Ethernet address for a contention channel to the set-top box.

The logic of control system 416 may also be placed in control system 404. For instance, if set-top box 442 requests channel 10, then control system 404 instructs television provider 406 to transmit channel 10 on MAN 408. Node 411 works the same to pull channel 10 off of MAN 408 and provide it to set-top box 442. In this example, not all two hundred channels are broadcast on MAN 408. Only the channels requested by one of the set-top boxes are broadcast on MAN 408. This helps conserve bandwidth on MAN 408. This is further illustrated in FIG. 7.

Figure 7:
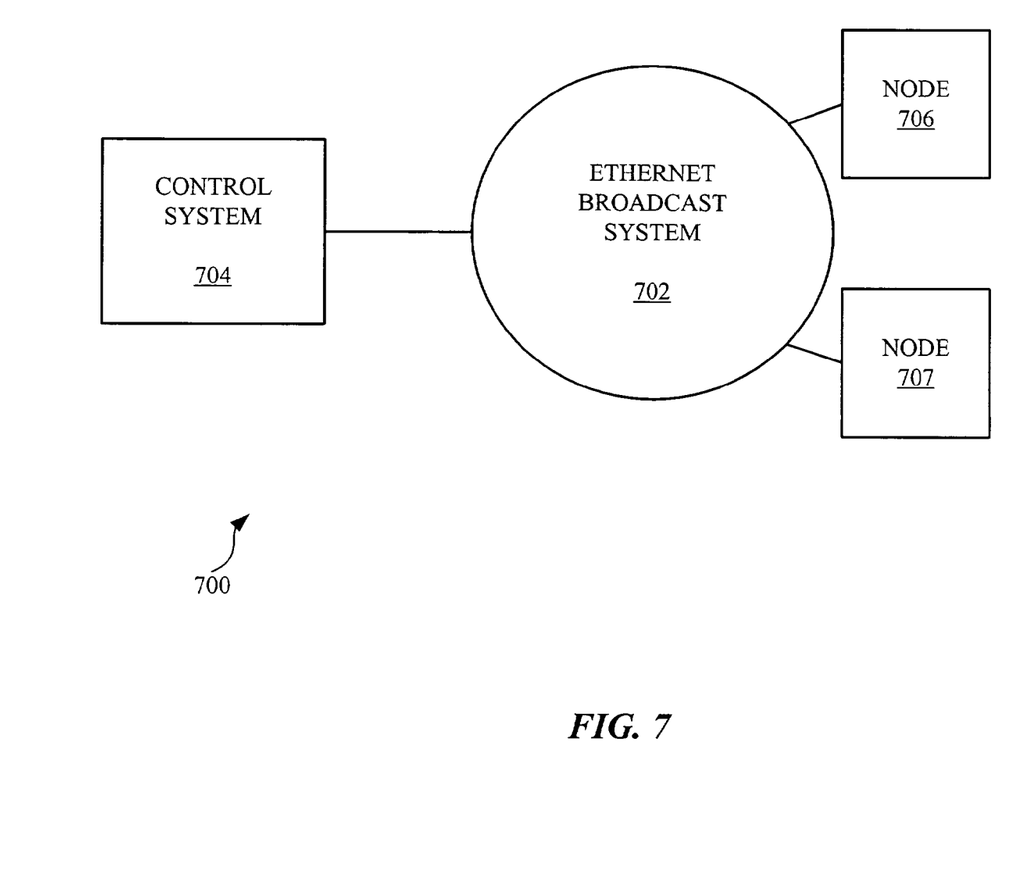
FIG. 7 illustrates a communication system in an example of the invention.

Communication System—FIG. 7

FIG. 7 illustrates a communication system 700 in an example of the invention. Communication system 700 is comprised of an Ethernet broadcast system 702, a control system 704, and nodes 706-707. Ethernet broadcast system 702 is coupled to control system 704 and nodes 706-707. Ethernet broadcast system 702 may comprise a Metropolitan Area Network (MAN), a Synchronous Optical Network (SONET) ring, or another network.

In operation, control system 704 receives a request for a video channel from node 706. Control system 704 determines the Ethernet address that corresponds to the requested video channel. Control system 704 transmits a response to the request that includes the Ethernet address of the requested video channel. Control system 704 also transmits the requested video channel to Ethernet broadcast system 702 which broadcasts the requested video channel. Transmitting the requested video channel to Ethernet broadcast system 702 in this instance could mean that control system 704 actually transmits the requested video channel to Ethernet broadcast system 702, and/or control system 704 controls or facilitates another system in transmitting the requested video channel to Ethernet broadcast system 702.

Node 706 receives the response from control system 704 that includes the Ethernet address of the requested video channel. Node 706 listens to Ethernet broadcast system 702 for the Ethernet address of the requested video channel to collect the requested video channel. Based on this disclosure, those skilled in the art will appreciate how to modify existing communication systems to make communication system 700.

In some embodiments, control system 704 receives another request for the video channel from node 707. Control system 704 transmits a response to the other request that includes the Ethernet address of the requested video channel. Control system 704 has already transmitted or is currently transmitting the requested video channel to Ethernet broadcast system 702 which broadcasts the requested video channel. Node 707 receives the response from control system 704 that includes the Ethernet address of the requested video channel. Node 707 listens to Ethernet broadcast system 702 for the Ethernet address of the requested video channel to collect the requested video channel. In this embodiment, both node 706 and 707 listen to the same Ethernet address to collect the same video channel.

What is claimed is:

1. A method of operating a communication device, the method comprising:
    configuring an Ethernet interface of the communication device to assign a first layer 2 Ethernet address to the Ethernet interface;
    listening to an Ethernet link to collect data having the first layer 2 Ethernet address;
    transmitting a request for a video channel;

receiving a response to the request that indicates a second layer 2 Ethernet address corresponding to the video channel;
programming the Ethernet interface of the communication device to assign the second layer 2 Ethernet address to the Ethernet interface; and
listening to the Ethernet link for the second layer 2 Ethernet address of the video channel to collect the video channel.

2. The method of claim 1 wherein the video channel comprises a television channel.

3. The method of claim 1 wherein the Ethernet link comprises a wireline Ethernet link.

4. The method of claim 1 wherein the Ethernet link comprises a wireless Ethernet link.

5. A non-transitory storage media readable by a computer, having instructions stored thereon, wherein the instructions, when executed by the computer, direct an Ethernet interface of the computer to listen to an Ethernet link to collect data having a first layer 2 Ethernet address, transmit a request for a video channel, receive a response to the request that indicates a second layer 2 Ethernet address corresponding to the video channel, program the Ethernet interface of the computer to assign the second layer 2 Ethernet address to the Ethernet interface, and direct the Ethernet interface of the computer to listen to the Ethernet link for the second layer 2 Ethernet address of the video channel to collect the video channel.

6. The non-transitory storage media readable by the computer of claim 5 wherein the video channel comprises a television channel.

7. The non-transitory storage media readable by the computer of claim 5 wherein the Ethernet link comprises a wireline Ethernet link.

8. The non-transitory storage media readable by the computer of claim 5 wherein the Ethernet link comprises a wireless Ethernet link.

9. A communication device, comprising:
a programmable Ethernet interface system configured to listen to an Ethernet link to collect a data having a first layer 2 Ethernet address; and
a processing system configured to transmit a request for a video channel, receive a response to the request that indicates a second layer 2 Ethernet address corresponding to the video channel, and program the programmable Ethernet interface system to assign the second layer 2 Ethernet address to the programmable Ethernet interface system;
the programmable Ethernet interface system further configured to listen to the Ethernet link for the second layer 2 Ethernet address of the video channel to collect the video channel.

10. The communication device of claim 9 wherein the video channel comprises a television channel.

11. The communication device of claim 9 wherein the Ethernet link comprises a wireline Ethernet link.

12. The communication device of claim 9 wherein the Ethernet link comprises a wireless Ethernet link.

13. A communication system, comprising:
an Ethernet broadcast system;
a node coupled to the Ethernet broadcast system and configured to receive a request for a video channel from a display system and transfer a response to the display system; and
a control system configured to receive the request for the video channel from the node, determine a layer 2 Ethernet address that corresponds to the video channel, transmit the response to the request wherein the response includes the layer 2 Ethernet address of the video channel, and transmit the video channel to the Ethernet broadcast system;
the Ethernet broadcast system configured to broadcast the video channel; and
the display system coupled to the Ethernet broadcast system and configured to transmit the request for the video channel, receive the response from the node that includes the layer 2 Ethernet address of the video channel, program an Ethernet interface of the display system to assign the layer 2 Ethernet address to the Ethernet interface, listen to the Ethernet broadcast system for the layer 2 Ethernet address of the video channel to collect the video channel, and display the video channel to a viewer.

14. The communication system of claim 13 wherein the Ethernet broadcast system comprises a Metropolitan Area Network (MAN).

15. The communication system of claim 13 wherein the video channel comprises a television channel.

16. A method of operating a communication system comprised of an Ethernet broadcast system, a node, and a control system, the method comprising:
in the node, receiving a request for a video channel from a display system into the node and transferring the request;
transferring a response to the request to the display system;
receiving the request in the control system for the video channel from the node;
in the control system,
determining a layer 2 Ethernet address of the video channel,
transmitting the response to the request wherein the response includes the layer 2 Ethernet address of the video channel, and
transmitting the video channel to the Ethernet broadcast system; and
in the Ethernet broadcast system, broadcasting the video channel;
in the display system,
transmitting the request for the video channel,
receiving the response from the node that includes the layer 2 Ethernet address of the video channel,
programming an Ethernet interface of the display system to assign the layer 2 Ethernet address to the Ethernet interface,
listening to the secondary Ethernet broadcast system for the layer 2 Ethernet address of the video channel to collect the video channel, and
displaying the video channel to a viewer.

17. The method of claim 16 wherein the Ethernet broadcast system comprises a Metropolitan Area Network (MAN).

18. The method of claim 16 wherein the video channel comprises a television channel.

19. A method of operating a communication system comprised of a primary Ethernet broadcast system, a node, and a secondary Ethernet broadcast system, the method comprising:
broadcasting a plurality of video channels on the primary Ethernet broadcast system, wherein each of the plurality of video channels corresponds to a layer 2 Ethernet address;
receiving a request in the node for one of the plurality of video channels;
in the node,
determining a layer 2 Ethernet address of said one of the plurality of video channels, transmitting a response to the request to a display system that includes the layer 2 Ethernet address of said one of the plurality of video channels, and transmitting said one of the plurality of video channels to the secondary Ethernet broadcast system; and in the secondary Ethernet broadcast system, broadcasting said one of the plurality of video channels using the layer 2 Ethernet address of said one of the plurality of video channels;

in the display system, transmitting the request for said one of the plurality of video channels, receiving the response from the node that includes the layer 2 Ethernet address of said one of the plurality of video channels, programming an Ethernet interface of the display system to assign the layer 2 Ethernet address to the Ethernet interface, listening to the secondary Ethernet broadcast system for the layer 2 Ethernet address of said one of the plurality of video channels to collect said one of the plurality of video channels, and displaying said one of the plurality of video channels to a viewer.

20. The method of claim 19 wherein the display system comprises a set-top box and a television.

21. The method of claim 19 further comprising transmitting a tear down message from the node to the display system to cause the display system to stop listening to the secondary Ethernet broadcast system for the layer 2 Ethernet address of said one of the plurality of video channels.

22. The method of claim 19 further comprising:

transmitting another request for one of the plurality of video channels from another display system to the node;

in the node, receiving the other request for said one of the plurality of video channels, and transmitting another response to the other request that includes the layer 2 Ethernet address of said one of the plurality of video channels to the other display system; and in the other display system, receiving the other response from the node that includes the layer 2 Ethernet address of said one of the plurality of video channels, listening to the secondary Ethernet broadcast system for the layer 2 Ethernet address of said one of the plurality of video channels to collect said one of the plurality of video channels, and displaying said one of the plurality of video channels to another viewer.

23. The method of claim 19 further comprising:

in the node, listening to the primary Ethernet broadcast system for the layer 2 Ethernet address of said one of the plurality of video channels to collect said one of the plurality of video channels.

24. The method of claim 19 further comprising transmitting said one of the plurality of video channels from the node to the secondary Ethernet broadcast system over a DSL link.

25. The method of claim 19 further comprising transmitting said one of the plurality of video channels from the node to the secondary Ethernet broadcast system using Internet Protocol (IP).

26. The method of claim 19 further comprising transmitting said one of the plurality of video channels from the node to the secondary Ethernet broadcast system using Asynchronous Transfer Mode (ATM) protocol.

27. The method of claim 19 wherein the secondary Ethernet broadcast system comprises a Local Area Network (LAN).

28. The method of claim 19 wherein the secondary Ethernet broadcast system comprises a wireless Local Area Network (LAN).

29. The method of claim 19 wherein the plurality of video channels comprise television channels.

30. A communication system, comprising:

a primary Ethernet broadcast system configured to broadcast a plurality of video channels, wherein each of the plurality of video channels corresponds to a layer 2 Ethernet address;

a node coupled to the primary Ethernet broadcast system; and a secondary Ethernet broadcast system coupled to the node;

the node configured to receive a request for one of the plurality of video channels from a display system, determine a layer 2 Ethernet address of said one of the plurality of video channels, transmit to the display system a response to the request that includes the layer 2 Ethernet address of said one of the plurality of video channels, and transmit said one of the plurality of video channels to the secondary Ethernet broadcast system;

the secondary Ethernet broadcast system configured to broadcast said one of the plurality of video channels using the layer 2 Ethernet address of said one of the plurality of video channels; and the display system coupled to the secondary Ethernet broadcast system and configured to transmit the request for said one of the plurality of video channels, receive the response from the node that includes the layer 2 Ethernet address of said one of the plurality of video channels, program an Ethernet interface of the display system to assign the layer 2 Ethernet address to the Ethernet interface, listen to the secondary Ethernet broadcast system for the layer 2 Ethernet address of said one of the plurality of video channels to collect said one of the plurality of video channels, and display said one of the plurality of video channels to a viewer.

31. The communication system of claim 30 wherein the display system comprises a set-top box and a television.

32. The communication system of claim 30 wherein the node is further configured to transmit a tear down message to the display system to cause the display system to stop listening to the secondary Ethernet broadcast system for the layer 2 Ethernet address of said one of the plurality of video channels.

33. The communication system of claim 30:

further comprising another display system coupled to the secondary Ethernet broadcast system and configured to transmit another request for said one of the plurality of video channels;

wherein the node is further configured to receive the other request for said one of the plurality of video channels, transmit another response to the other request that includes the layer 2 Ethernet address of said one of the plurality of video channels;

the other display system further configured to receive the other response from the node that includes the layer 2 Ethernet address of said one of the plurality of video channels, listen to the secondary Ethernet broadcast system for the layer 2 Ethernet address of said one of the plurality of video channels to collect said one of the plurality of video channels, and display said one of the plurality of video channels to another viewer.

34. The communication system of claim 30 wherein the node is further configured to listen to the primary Ethernet broadcast system for the layer 2 Ethernet address of said one of the plurality of video channels to collect said one of the plurality of video channels.

35. The communication system of claim 30 wherein the secondary Ethernet broadcast system is coupled to the node by a DSL link.

36. The communication system of claim 30 wherein the node is further configured to transmit said one of the plurality of video channels to the secondary Ethernet broadcast system using Internet Protocol (IP).

37. The communication system of claim 30 wherein the node is further configured to transmit said one of the plurality of video channels to the secondary Ethernet broadcast system using Asynchronous Transfer Mode (ATM).

38. The communication system of claim 30 wherein the secondary Ethernet broadcast system comprises a Local Area Network (LAN).

39. The communication system of claim 30 wherein the secondary Ethernet broadcast system comprises a wireless Local Area Network (LAN).

40. The communication system of claim 30 wherein the plurality of video channels comprise television channels.

\* \* \* \* \*